United States Patent
Ihs (10) Patent No.: US 10,139,888 B2
(45) Date of Patent: Nov. 27, 2018

(54) DYNAMIC FREQUENCY SCALING BASED ON SUPPLY CURRENT MONITORING

(71) Applicant: Endura IP Holdings Ltd., George Town (KY)

(72) Inventor: Hassan Ihs, San Diego, CA (US)

(73) Assignee: Chaoyang Semiconductor Jiangyin Technology Co., Ltd., Jiangyin (CN)

( * ) Notice: Subject to any disclaimer, the term of this patent is extended or adjusted under 35 U.S.C. 154(b) by 0 days.

(21) Appl. No.: 15/174,884

(22) Filed: Jun. 6, 2016

(65) Prior Publication Data

US 2016/0357242 A1 Dec. 8, 2016

Related U.S. Application Data (60) Provisional application No. 62/172,007, filed on Jun. 5, 2015.

(51) Int. Cl.
*G06F 1/32* (2006.01)
*G06F 1/26* (2006.01)
*G06F 1/08* (2006.01)

(52) U.S. Cl.
CPC ............... *G06F 1/324* (2013.01); *G06F 1/26* (2013.01); *G06F 1/3296* (2013.01); *G06F 1/08* (2013.01); *G06F 1/3212* (2013.01); *Y02D 10/126* (2018.01); *Y02D 10/172* (2018.01)

(58) Field of Classification Search
CPC .......... G06F 1/324; G06F 1/08; G06F 1/3212; G06F 1/3203; B60L 1/16
See application file for complete search history.

(56) References Cited

U.S. PATENT DOCUMENTS

| | | | |
|---|---|---|---|
| 4,727,318 A | 2/1988 | Sakai et al. | |
| 2005/0184197 A1* | 8/2005 | Pierson | A63H 19/24 246/1 R |
| 2007/0088962 A1 | 4/2007 | Yu | |
| 2007/0263416 A1 | 11/2007 | Tsai et al. | |
| 2008/0301478 A1* | 12/2008 | Scott | G06F 1/08 713/320 |
| 2009/0134857 A1* | 5/2009 | Zeng | H02M 3/156 323/282 |
| 2010/0085031 A1 | 4/2010 | Dobberpuhl et al. | |
| 2010/0253316 A1* | 10/2010 | Araki | H02M 7/53871 323/350 |

(Continued)

FOREIGN PATENT DOCUMENTS

| | | |
|---|---|---|
| JP | 2002-312073 A | 10/2002 |
| KR | 10-2008-0017641 A | 2/2008 |
| WO | WO 96-28877 A1 | 9/1996 |

OTHER PUBLICATIONS

International Search Report on related PCT Application No. PCT/US2016/036106 from International Searching Authority (KIPO) dated Sep. 29, 2016.

(Continued)

*Primary Examiner* — Jaweed A Abbaszadeh
*Assistant Examiner* — Gayathri Sampath
(74) *Attorney, Agent, or Firm* — Klein, O'Neill & Singh, LLP (57) ABSTRACT

A system for performing dynamic frequency scaling may include a voltage regulator and a decision block. The decision block may be configured to determine a target frequency of operations for a system on chip.

18 Claims, 5 Drawing Sheets

(56) References Cited

U.S. PATENT DOCUMENTS

| | | |
|---|---|---|
| 2012/0054503 A1 | 3/2012 | Hsiao et al. |
| 2012/0239954 A1* | 9/2012 | Kim .................. H04W 52/0287 |
| | | 713/322 |
| 2013/0205149 A1 | 8/2013 | Chen |
| 2013/0212417 A1 | 8/2013 | Frid et al. |
| 2014/0152278 A1 | 6/2014 | Shepard et al. |
| 2014/0184177 A1 | 7/2014 | Tournatory et al. |
| 2014/0225586 A1 | 8/2014 | Covi et al. |
| 2015/0130821 A1 | 5/2015 | Shah et al. |
| 2015/0134982 A1 | 5/2015 | Park et al. |

OTHER PUBLICATIONS

Written Opinion on related PCT Application No. PCT/US2016/036106 from International Searching Authority (KIPO) dated Sep. 29, 2016.

Extended European Search Report on related European Patent Application No. 16804675.3 from the European Patent Office (EPO) dated May 22, 2018.

\* cited by examiner

DYNAMIC FREQUENCY SCALING BASED ON SUPPLY CURRENT MONITORING

CROSS REFERENCE TO RELATED APPLICATION

This application claims the benefit of the filing date of U.S. Provisional Patent Application No. 62/172,007, filed on Jun. 5, 2015, the disclosure of which is incorporated by reference herein.

BACKGROUND OF THE INVENTION

The present invention relates generally to power regulation of integrated circuits, and more particularly to load current based dynamic frequency scaling for integrated circuits.

Integrated circuits generally require provision of power within particular parameters during operation. The provision of such power may face many complexities. For example, some devices may be powered by batteries having relatively small capacities, while the devices themselves, at least at various times, may require large amounts of power. Operating such devices to avoid excessive power usage may be desirable.

One way to reduce power usage by an integrated circuit is to operate the integrated circuit at a lower clock speed. Unfortunately, high level determinations of expected power usage by an integrated circuit, for example by estimating a processing workload by considering types of operations expected to be performed, may not accurately gauge expected power requirements.

BRIEF SUMMARY OF THE INVENTION

Some embodiments in accordance with aspects of the invention provide for dynamic frequency scaling based on an indication of load current.

Some embodiments in accordance with aspects of the invention provide a system useful for controlling power consumption by integrated circuitry, comprising: a voltage regulator configured to provide regulated power to a load comprising integrated circuitry of a system-on-chip (SOC), the voltage regulator including circuitry for determining a digital signal indicative of load current; phase-locked loop (PLL) circuitry configured to provide a plurality of clock signals, each of the plurality of clock signals at a different frequency signal indicative of current operating frequency to be used by a system-on-chip (SOC); and a decision block configured to generate a selection signal for selecting one of the plurality of clock signals, for use by the integrated circuitry of the SOC, based on a currently selected clock signal and the signal indicative of the load current.

Some embodiments in accordance with aspects of the invention provide a method useful for determining a target operating frequency to be used by a system-on-chip (SOC), comprising: selecting a first target operating frequency; determining whether load current exceeds a first predefined operational current; if the load current exceeds the first predefined operational current, selecting a second target operating frequency; determining whether the load current exceeds a second predefined operational current; if the load current exceeds the second predefined operational current, selecting a third target operating frequency; determining whether the load current exceeds a third predefined operational current; and if the load current exceeds the third predefined operational current, selecting a fourth target operating frequency.

These and other aspects of the invention are more fully comprehended upon review of this disclosure.

DETAILED DESCRIPTION

Figure 1:
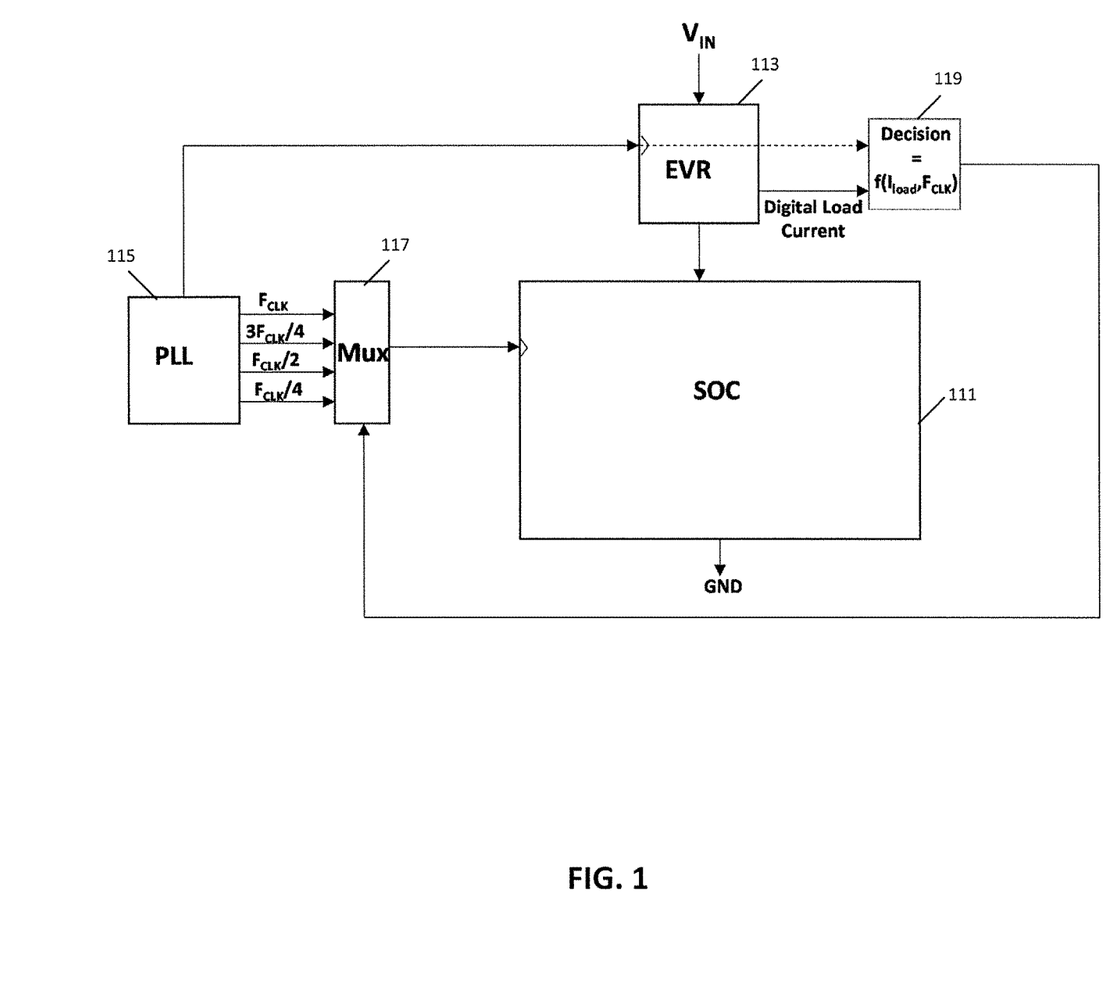
FIG. 1 is a block diagram of a system for performing dynamic frequency scaling (DFS) operations in accordance with aspects of the invention.

FIG. 1 is a block diagram of a system for performing dynamic frequency scaling (DFS) operations in accordance with aspects of the invention. In the system of FIG. 1, dynamic frequency scaling is performed based on an indication of load current. In FIG. 1, an embedded voltage regulator (EVR) 113 receives an input voltage VIN and a clock signal from a phase-locked loop (PLL) 115, and supplies a regulated power to a load, which is shown as a system on chip (SOC) 111. In some embodiments, the EVR and the SOC are all part of one device, for example a cellular or smart telephone device or other portable computer device. Moreover, in various embodiments the EVR and the SOC are within the same package for semiconductors, and in some embodiments are in the same multichip module, or even on the same chip.

Power consumption by the SOC is to an extent controlled by a decision block 119. Power consumed by the SOC, when the SOC is performing operations, is generally a function of frequency of operations performed by the SOC. Reduction of frequency of clock signals provided to the SOC generally reduces power consumed by the SOC. The decision block 119 generally determines a target frequency of operations, which may be considered a frequency operating point, or frequency set or operating point. The decision block, for example, may generate a decision signal for deciding a frequency operating point in response to an indication of current operating frequency of the SOC and an indication of load current provided by the EVR to the SOC. As such, the decision signal is a function of the frequency of the clock signal and the indication of load current. In some embodiments, and as shown in FIG. 1, the EVR may forward the clock signal provided by the PLL directly to the decision block. In various embodiments, the EVR is a switching converter, for example, operating high side and low side switches so as to regulate voltage applied to a load. In some embodiments, the EVR is a switching converter as discussed in more detail in U.S. patent application Ser. No. 62/171,983, entitled Voltage Regulator Current Load Sensing, filed of even date herewith, the disclosure of which is incorporated herein by reference for all purposes.

As illustrated in FIG. 1, a multiplexer 117 receives multiple clock signals, operating at various frequencies from a highest frequency $F_{CLK}$ to a lowest frequency, shown as $F_{CLK}/4$ in FIG. 1. The multiplexer receives the clock signals from the PLL. As one skilled in the art would understand, a plurality of separate PLLs may instead be used to provide the multiple clock signal, with for example each of the separate PLLs providing one of the clock signals, and the PLL or the plurality of separate PLLs may alone or together be considered PLL circuitry. In some embodiments, the PLL may include divisors in dividing a system clock signal, which may be provided by a voltage-controlled oscillator (VCO). In some embodiments, and as illustrated in FIG. 1, the clock signals include a first clock signal at a frequency $F_{CLK}$, a second clock signal at a frequency $3F_{CLK}/4$, a third clock signal at a frequency $F_{CLK}/2$, and a fourth clock signal at a frequency $F_{CLK}/4$. The multiplexer selects one of the clock signals for use based on the decision signal of the decision block 119, and provides the selected clock signal to the SoC as a frequency of operation. In some embodiments, the SoC may be a processor or a microcontroller. In various embodiments, the SoC may contain digital, analog, mixed-signal, and/or radio-frequency functions.

Figure 2:
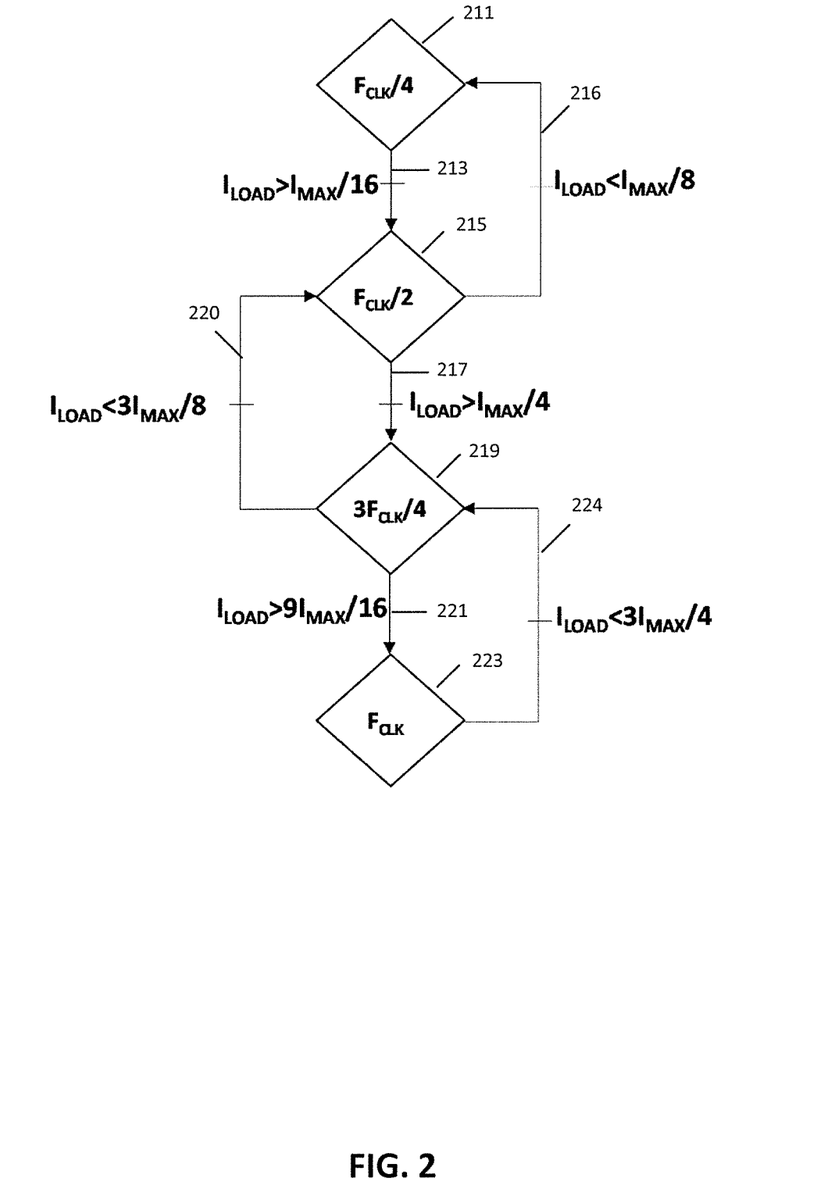
FIG. 2 is a flow diagram of a process for determining a target operating frequency based on load current in accordance with aspects of the invention.

FIG. 2 is a flow diagram of a process for determining a target operating frequency based on load current in accordance with aspects of the invention. In some embodiments, the process is performed by the decision block 119 of FIG. 1. In some embodiments, the process is performed by digital circuitry. In some embodiments, the process is performed by processor circuitry configured by program instructions.

In block 211, the process selects a target operating frequency of one-fourth of a frequency of a system clock signal ($F_{CLK}/4$). If the process determines that the load current exceeds one-sixteenth of a maximum operational current ($I_{MAX}/16$), then the process takes transition 213 to block 215.

At block 215, the process selects a target operating frequency of one-half of the frequency of the system clock signal ($F_{CLK}/2$). If the process determines that the load current is less than one-eighth of the maximum operational current ($I_{MAX}/8$), then the process takes transition 216 back to block 211. If, however, the process determines that the load current exceeds one-fourth of the maximum operational current ($I_{MAX}/4$), then the process takes transition 217 to block 219.

At block 219, the process selects a target operating frequency of three-fourths of the frequency of the system clock signal ($3F_{CLK}/4$). If the process determines that the load current is less than three-eighths of the maximum operational current ($3I_{MAX}/8$), then the process takes transition 220 back to block 215. If, however, the process determines that the load current exceeds nine-sixteenths of the maximum operational current ($9I_{MAX}/16$), then the process takes transition 221 to block 223.

At block 223, the process selects a target operating frequency equivalent to the frequency of the system clock signal ($F_{CLK}$). If the process determines that the load current is less than three-fourths of the maximum operational current ($3I_{MAX}/4$), then the process takes transition 224 back to block 219.

In various embodiments, the process selects the target operating frequency by commanding, e.g. the decision block 119 of FIG. 1, to send a signal to, e.g. the multiplexer 117 of FIG. 1, to select the target operating frequency, which in some embodiments, may be provided by a phase-locked loop, e.g. the PLL 115 of FIG. 1. In some embodiments, the load current may be an output load current provided by a voltage regulator, e.g. the EVR 113 of FIG. 1.

Figure 3:
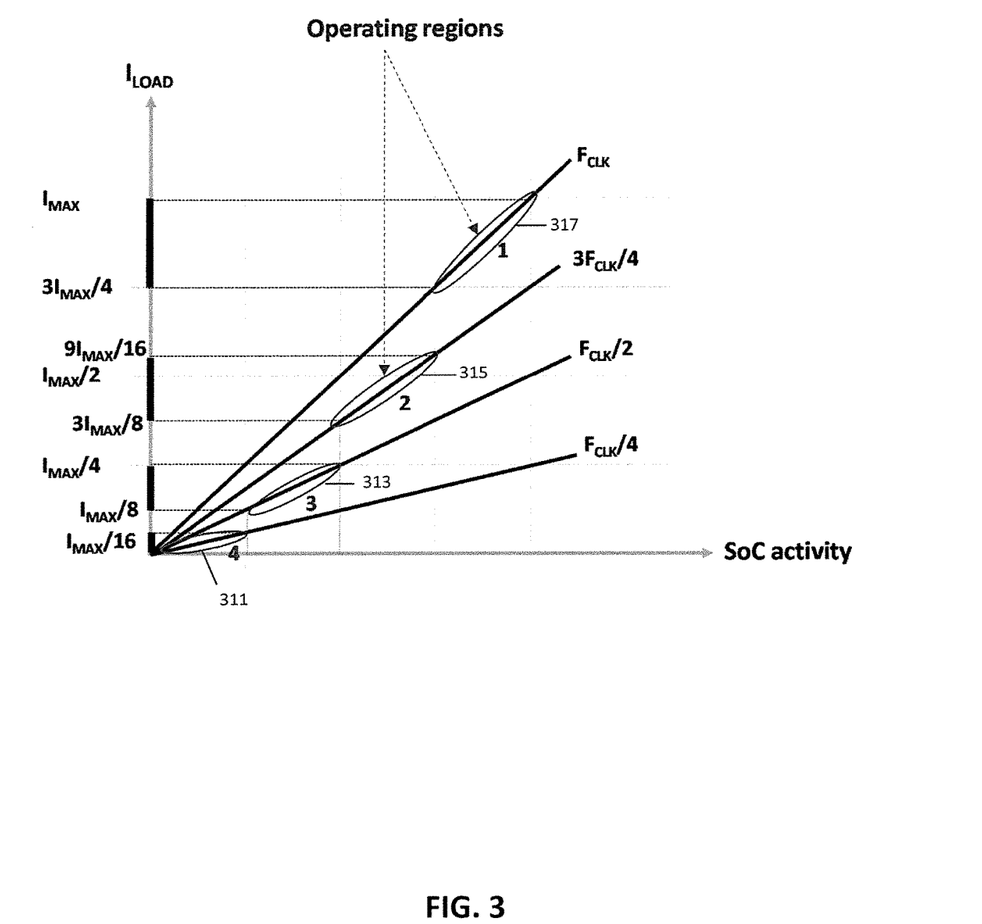
FIG. 3 provides a chart showing simulated results of various levels of load current with respect to system on chip (SoC) activity, for a particular process such as the process of FIG. 2.

FIG. 3 provides a chart showing simulated results of various levels of load current with respect to system on chip (SoC) activity, for a particular process such as the process of FIG. 2.

As shown in FIG. 3, the simulated current load generally increases linearly as SoC activity increases. The SoC generally operates in different operating regions depending on a selected target operating frequency. Moreover, levels of current jump may vary when switching from one target operating frequency to another.

More specifically, when a target operating frequency of $F_{CLK}/4$ is selected, where $F_{CLK}$ may be a frequency of a system clock, current jump is equivalent to $I_{MAX}/4$, where $I_{MAX}$ may be a maximum operational current. With the target operating frequency of $F_{CLK}/4$, as shown in FIG. 3, the SoC operates in low power idle region 311. When a target operating frequency of $F_{CLK}/2$ is selected, current jump is equivalent to $3I_{MAX}/8$. With the target operating frequency of $F_{CLK}/2$, the SoC operates in low power regular region 313. When a target operating frequency of $3F_{CLK}/4$ is selected, current jump is also $3I_{MAX}/8$. With the target operating frequency of $3F_{CLK}/4$, the SoC operates in high performance regular region 315. And when a target operating frequency of $F_{CLK}$ is selected, current jump is also $I_{MAX}/4$, as with the target operating frequency of $F_{CLK}/4$. With respect to this target operating frequency, the SoC operates in high performance busy region 317.

Figure 4:
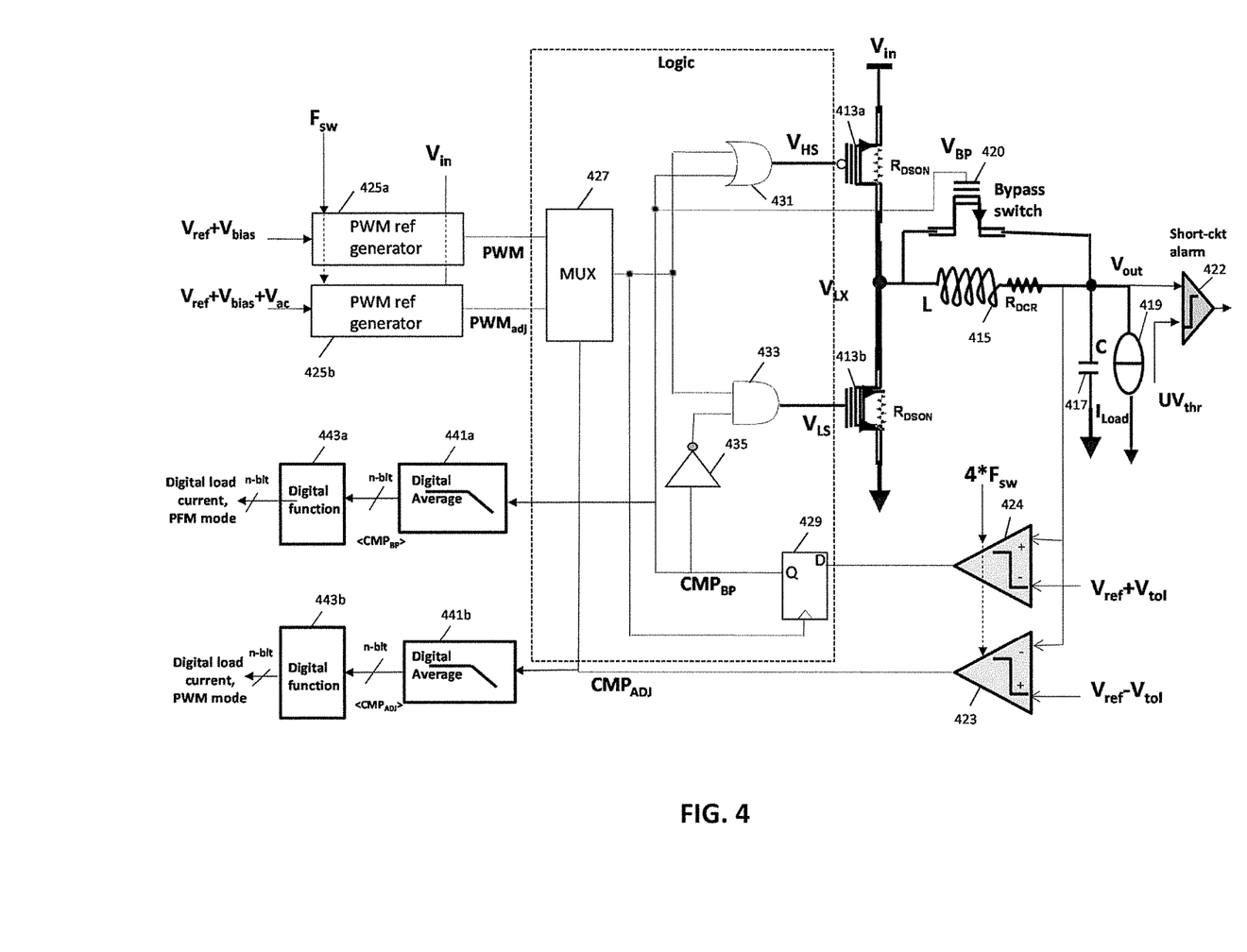
FIG. 4 is a semi-schematic, semi-block diagram of a voltage regulator in accordance with aspects of the invention.

FIG. 4 is a semi-schematic, semi-block diagram of a voltage regulator in accordance with aspects of the invention. The voltage regulator includes circuitry, digital circuitry in various embodiments, for determining an indication of load current supplied to a load. The indication of load current may be useful in many respects, including in operation of the voltage regulator, in determining if an over current situation exists, and in allowing for improved thermal management. In various embodiments the circuitry includes circuitry for determining whether an output voltage of the voltage regulator is above and/or below a predefined range of voltages, for determining an average of such occurrences, and for determining an indication of load current based on the average of such occurences. In some embodiments, the voltage regulator of FIG. 4 may be implemented circuitry of the embedded voltage regulator (EVR) 113 of FIG. 1.

As illustrated in FIG. 4, the converter includes a high side switch 413a, a low side switch 413b, a bypass switch 420, an output inductor 415, an output capacitor 417, a logic circuitry 421 for controlling the high side, low side, and bypass switches, a first comparator 423, a second comparator 424, a third comparator 422, a first pulse-width modulation (PWM) generator 425a, a second PWM generator 425b, a first digital average block 441a, a second digital average block 441b, a first digital function block 443a, and a second digital function block 443b.

The voltage regulator of FIG. 4 operates the high side, low side, and bypass switches so as to regulate voltage applied to a load 419. In doing so, the converter operates the high side and low side switches either in accordance with PWM signals. In the embodiment of FIG. 4, multiple PWM generators are shown, but in many embodiments only a single PWM generator may be used. In embodiments with multiple PWM generators, PWM signals generated by either the first PWM generator 425a or the second PWM generator 425b may be selected for example based on whether an output voltage of the converter is below a predetermined magnitude, for example, as indicated by the first comparator 423. The PWM generators, and other aspects of the voltage regulator of FIG. 4, are discussed in more detail in U.S. patent application Ser. No. 14/732,505, entitled DC-DC Converter Having Digital Control and Reference PWM Generators, filed of even date herewith, the disclosure of which is incorporated herein by reference for all purposes. The converter also operates the bypass switch, also optimal in many embodiments, in accordance with an output provided by the second comparator 424 indicating whether the output voltage of the converter is above a predetermined magnitude.

Outputs of each of the comparators are also provided to the first digital average block 441a and the second digital average block 441b, respectively. The digital averages are provided to the first digital function block 443a and the second digital function block 443b, respectively, which determine an indication of load current. In some embodiments, the indication of load current may be provided to a decision block, e.g. the decision block 119 of FIG. 1.

Referring to FIG. 4, the high side switch 413a and the low side switch 413b are coupled in series between a first voltage source and a second voltage source. The first voltage source is at a higher voltage than the second voltage source, with the high side switch coupling the first voltage source to the low side switch, and the low side switch coupling the second voltage source to the high side switch. The high side and low side switches may be formed, for example, with metal-oxide-semiconductor field-effect transistor (MOSFET) transistors, with a p-channel MOS transistor forming the high side switch and an n-channel MOS transistor forming the low side switch. In operation, either the high side switch is active, the low side switch is active, or neither switch is active. For illustrative purposes, the high side and low side switches also show a resistance ($R_{DSON}$) provided by the switches.

The output inductor 415 has one end coupled to a node between the high side switch 413a and the low side switch 413b, and also to a first end of the bypass switch 420. Another end of the output inductor is coupled to the output capacitor 417, a second end of the bypass switch 420, and the load 419, with the load current $I_{LOAD}$ passing through the load. A node coupling the other end of the output inductor, the output capacitor, and the load generally may be considered the output of the voltage regulator. For illustrative purposes, the other end of the output inductor 415 also shows a resistance ($R_{DCR}$) provided by the output inductor and associated circuit paths, e.g., a parasitic effect.

The first comparator 423, the second comparator 424, and the third comparator 422 generally have a first input coupled to the output node, their second inputs coupled to reference voltages, and the comparators configured to determine which input is greater. With respect to the first comparator 423, the reference voltage, for example, may be a desired output voltage of the voltage regulator minus a tolerance voltage. The first comparator therefore determines whether the output voltage of the voltage regulator is less than or greater than a desired output voltage minus a tolerance voltage. With respect to the second comparator 424, the reference voltage may be the desired output voltage of the voltage regulator plus a tolerance voltage. The second comparator therefore determines whether the output voltage of the voltage regulator is greater than or less than the desired output voltage plus the tolerance voltage. With respect to the third comparator 422, the reference voltage may be a minimum operational voltage for the voltage regulator. The third comparator therefore determines whether the output voltage of the voltage regulator drops below the minimum operational voltage. Operations below the minimum operational voltage generally indicates a short circuit, and an output of the third comparator is may be provided to a short-circuit alarm to prevent a device from operating under conditions indicating a short circuit situation.

The logic circuitry 421 may receive the output signals from the first and second comparators, and the signals generated by the first and second PWM generators to control states of the high side, low side, and bypass switches. The logic circuitry 421 generally controls the states of the high side, low side, and bypass switches by way of producing control signals for controlling those switches. Referring to FIG. 4, the logic circuitry 421 includes a multiplexer 427 which receives the PWM and $PWM_{adj}$ signals, and selects one of them for use based on an output $CMP_{ADJ}$ of the first comparator 423.

As shown in FIG. 4, a latch 429 stores the signal produced by the second comparator 424. The latch stores the signal when an output of the multiplexer, indicating an end of the duty cycle of the converter switches, transitions to a high state. An output of the latch (which may be referred to as $CMP_{BP}$) is provided to a gate of the bypass switch, an OR gate 431 and, after passing through an inverter 435, to an AND gate 433. The OR gate also receives the output of the multiplexer, and provides an output to a gate of the high side switch. The high side switch, active when its gate input is low, is therefore active when both the output of the multiplexer and the output of the latch are low. The AND gate also receives the output of the multiplexer, and provides an output to a gate of the low side switch. The low side switch, active when its gate input is high, is therefore active when the inverted latch output is high and the output of the multiplexer is high.

As further shown in FIG. 4, the first digital average block 441a receives the output ($CMP_{BP}$) of the latch 429. In various embodiments, the first digital average block monitors the output $CMP_{BP}$ by way of recording the output $CMP_{BP}$ over a period of time, and generates a digital average (which may be referred to as $<CMP_{BP}>$) of the output $CMP_{BP}$ based on recorded values of the output $CMP_{BP}$. The first digital logic block 443a, in various embodiments, receives the digital average $<CMP_{BP}>$ from the first digital average block, and determines and outputs a first digital load current based on the digital average $<CMP_{BP}>$. The digital average $<CMP_{BP}>$ may be considered a function of load current, a converter input voltage, the desired output voltage of the voltage regulator, an inductance value of the output inductor, and a period of a switching frequency of the voltage regulator. In some embodiments a correlation of $<CMP_{BP}>$ and load current is determined based on voltage regulator topology. In some embodiments the correlation of $<CMP_{BP}>$ and load current is determined based on simulation and/or measurement of voltage regulator operation under various load conditions. In some embodiments, and as later discussed with respect to FIG. 5, $<CMP_{BP}>$ may be considered to be related to load current by a first order equation, for example of the form $<CMP_{BP}>=mI_{Load+b}$.

Similarly, the second digital average block 441b receives the output ($CMP_{ADJ}$) of the first comparator 423. In various embodiments, the second digital average block monitors the output $CMP_{ADJ}$ by way of recording the output $CMP_{ADJ}$ over a period of time, and generates a digital average (which may be referred to as $<CMP_{ADJ}>$) of the output $CMP_{ADJ}$ based on recorded values of the output $CMP_{ADJ}$. The second digital logic block 443b, in various embodiments, receives the digital average <$CMP_{ADJ}$> from the second digital average block, and determines and outputs a second digital load current based on the digital average <$CMP_{ADJ}$>. The digital average <$CMP_{ADJ}$> may be considered a function of the second digital load current, the bias voltage, the voltage offset, and a parasitic resistance (for example of the switches and output inductor) of the voltage regulator.

Figure 5:
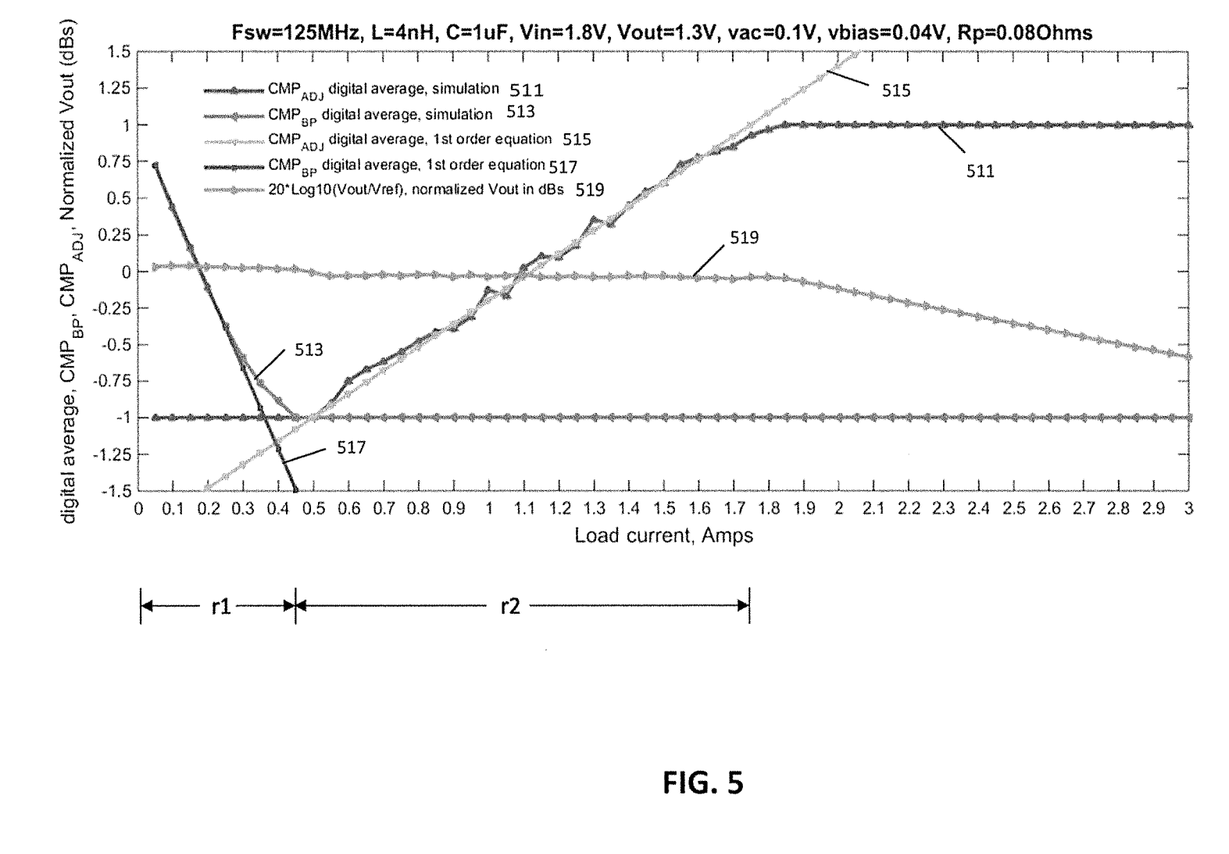
FIG. 5 provides a chart showing simulated averages of the $CMP_{BP}$ and $CMP_{ADJ}$ signals with respect to load current, for a particular operating topology such as that of the embodiment of FIG. 4.

FIG. 5 provides a chart showing simulated averages of the $CMP_{BP}$ and $CMP_{ADJ}$ signals with respect to load current, for a particular operating topology such as that of the embodiment of FIG. 4. For the topology of FIG. 4, the PWM generator may be considered to determine PWM duty cycles using an input voltage of a desired converter output voltage plus a bias voltage vbias, and the $PWM_{adj}$ generator may be considered to determine $PWM_{adj}$ duty cycles using an input voltage of the desired converter output voltage plus the bias voltage vbias plus an adjustment voltage vac. As shown in FIG. 5, the simulated average of the $CMP_{BP}$ signal 513 generally decreases linearly in a first region r1 of lower load current, and thereafter remains at a minimum value in a second region r2 of higher load current. The simulated average of the $CMP_{ADJ}$ signal 511, to the contrary, generally increases linearly in the second region r2 of higher load current, after being at a minimum value in the first region r1 of lower load current.

The first region r1 may be considered to overlap and/or correspond to time periods in which the converter is operating in PFM mode, as the $CMP_{BP}$ periodically goes high, as indicated by the non-minimum values of the simulated average of $CMP_{BP}$. Similarly, the second region r2 may be considered to overlap and/or correspond to time periods in which the converter is operating in PWM mode, as the $CMP_{BP}$ signal generally does not go high.

From FIG. 5, it may be seen that a first line 517 described by one first order equation largely corresponds to the simulated digital average of $CMP_{BP}$ with respect to load current, and a second line 515 described by another first order equation largely correspond to the simulated digital average of $CMP_{ADJ}$ with respect to load current. Accordingly, it is believed the digital average of $CMP_{BP}$ may be used to determine an indication of load current when the converter is operating in PFM mode, and the digital average of $CMP_{ADJ}$ may be used to determine an indication of load current when the converter is operating in PWM mode.

Although the invention has been discussed with respect to various embodiments, it should be recognized that the invention comprises the novel and non-obvious claims supported by this disclosure.

What is claimed is:

1. A system useful for controlling power consumption by integrated circuitry, comprising:
   a voltage regulator configured to provide regulated power to a load comprising integrated circuitry of a system-on-chip (SOC), the voltage regulator including circuitry for determining a digital signal indicative of load current based upon an average result over time of a comparison between an output voltage of the voltage regulator and a reference voltage;
   phase-locked loop (PLL) circuitry configured to provide a plurality of clock signals based on a system clock signal, each of the plurality of clock signals at a different frequency signal that is a fraction of a frequency of the system clock signal and is indicative of current operating frequency used by the system-on-chip (SOC); and
   a decision block configured to generate a selection signal for selecting one of the plurality of clock signals, for use by the load comprising integrated circuitry of the SOC, based on a currently selected clock signal and the digital signal indicative of load current.

2. The system of claim 1 further comprising a multiplexer configured to receive the plurality of clock signals from the PLL circuitry, the multiplexer configured to provide one of the plurality of clock signals to the load comprising integrated circuitry of the SOC based on the selection signal generated by the decision block.

3. The system of claim 1, wherein the decision block is configured to generate the selection signal so as to increase a target frequency of operations to be used by the load comprising integrated circuitry of the SOC when the digital signal indicative of load current exceeds a first predefined magnitude.

4. The system of claim 1, wherein the decision block is configured to generate the selection signal so as to reduce the target frequency of operations to be used by the load comprising integrated circuitry of the SOC when the digital signal indicative of load current is below a second predefined magnitude.

5. The system of claim 1, wherein the plurality of clock signals includes a first clock signal at a frequency F, a second clock signal at a frequency 3F/4, a third clock signal at a frequency F/2, and a fourth clock signal at a frequency F/4.

6. The system of claim 5, wherein the decision block is configured to generate the selection signal to select the second clock signal when the first clock signal is the currently selected clock signal and the digital signal indicative of load current indicates a load current less than a first predefined fraction of a predefined maximum load current.

7. The system of claim 6, wherein the decision block is configured to generate the selection signal to select the third clock signal when the second clock signal is the currently selected clock signal and the digital signal indicative of load current indicates a load current less than a second predefined fraction of a predefined maximum load current.

8. The system of claim 7, wherein the decision block is configured to generate the selection signal to select the fourth clock signal when the third clock signal is the currently selected clock signal and the digital signal indicative of load current indicates a load current less than a third predefined fraction of a predefined maximum load current.

9. The system of claim 8, wherein the decision block is configured to generate the selection signal to select the third clock signal when the fourth clock signal is the currently selected clock signal and the digital signal indicative of load current indicates a load current greater than a fourth predefined fraction of a predefined maximum load current.

10. A method useful for determining a target operating frequency to be used by a load comprised of a system-on-chip (SOC), the load being supplied a load current by a voltage regulator comprising:
   selecting a first target operating frequency to be used by the load;
   determining the load current of the load based upon an average result over time of a comparison between an output voltage of the voltage regulator and a reference voltage;
   determining whether the load current exceeds a first predefined operational current;
   if the load current exceeds the first predefined operational current, selecting a second target operating frequency to be used by the load;
   determining whether the load current exceeds a second predefined operational current;

if the load current exceeds the second predefined operational current, selecting a third target operating frequency to be used by the load;

determining whether the load current exceeds a third predefined operational current;

if the load current exceeds the third predefined operational current, selecting a fourth target operating frequency to be used by the load; and where the first, second, third and fourth operating frequencies are a fraction of a frequency of a system clock signal.

11. The method of claim 10, wherein the first target operating frequency is one-fourth of a frequency of the system clock signal, the second target operating frequency is one-half of the frequency of the system clock signal, the third target operating frequency is three-fourths of the frequency of the system clock signal, and the fourth target operating frequency is the frequency of the system clock signal.

12. The method of claim 10, wherein the first predefined operational current is one-sixteenth of a maximum operational current, the second predefined operational current is one-fourth of the maximum operational current, and the third predefined operational current is nine-sixteenth of the maximum operational current.

13. The method of claim 10, further comprising:

determining whether the load current is less than a fourth predefined operational current;

if the load current is less than the fourth predefined operational current, selecting the first target operating frequency to be used by the load;

determining whether the load current is less than a fifth predefined operational current;

if the load current is less than the fifth predefined operational current, selecting the second target operating frequency to be used by the load;

determining whether the load current is less than a sixth predefined operational current; and if the load current is less than the sixth predefined operational current, selecting the third target operating frequency to be used by the load.

14. The method of claim 13, wherein the fourth predefined operational current is one-eighth of a maximum operational current, the fifth predefined operational current is three-eighths of the maximum operational current, and the sixth operational current is three-fourths of the maximum operational current.

15. The method of claim 10, wherein the load operates in low power idle region when the first target operating frequency is selected.

16. The method of claim 10, wherein the load operates in low power regular region when the second target operating frequency is selected.

17. The method of claim 10, wherein the load operates in high performance regular region when the third target operating frequency is selected.

18. The method of claim 10, wherein the load operates in high performance busy region when selecting the fourth target operating frequency.

* * * * *